United States Patent
Tinnin

(10) Patent No.: US 10,023,222 B2
(45) Date of Patent: Jul. 17, 2018

(54) STEERING COLUMN ASSEMBLY HAVING AN ENERGY ABSORPTION ASSEMBLY

(71) Applicant: Steering Solutions IP Holding Corporation, Saginaw, MI (US)

(72) Inventor: Melvin L. Tinnin, Clio, MI (US)

(73) Assignee: STEERING SOLUTIONS IP HOLDING CORPORATION, Saginaw, MI (US)

( * ) Notice: Subject to any disclaimer, the term of this patent is extended or adjusted under 35 U.S.C. 154(b) by 0 days.

(21) Appl. No.: 15/180,155

(22) Filed: Jun. 13, 2016

(65) Prior Publication Data

US 2016/0368524 A1 Dec. 22, 2016

Related U.S. Application Data

(60) Provisional application No. 62/180,110, filed on Jun. 16, 2015.

(51) Int. Cl.
*B62D 1/19* (2006.01)

(52) U.S. Cl.
CPC .................................. *B62D 1/192* (2013.01)

(58) Field of Classification Search
CPC ... B62D 1/192; F16F 7/12; F16F 7/123; F16F 7/128
See application file for complete search history.

(56) References Cited

U.S. PATENT DOCUMENTS

| | | | |
|---|---|---|---|
| 5,520,416 A | 5/1996 | Singer et al. | |
| 5,706,704 A | 1/1998 | Riefe et al. | |
| 7,325,834 B2 | 2/2008 | Manwaring et al. | |
| 9,669,862 B1 * | 6/2017 | Dubay | B62D 1/195 |
| 2003/0102658 A1 | 6/2003 | McCarthy et al. | |
| 2004/0217581 A1 | 11/2004 | Dubay et al. | |
| 2006/0049621 A1 | 3/2006 | Lee et al. | |
| 2007/0194563 A1 | 8/2007 | Menjak et al. | |
| 2007/0228716 A1 | 10/2007 | Menjak et al. | |
| 2008/0111363 A1 | 5/2008 | Menjak et al. | |
| 2009/0033082 A1 * | 2/2009 | Klukowski | B62D 1/195 280/777 |
| 2015/0128752 A1 * | 5/2015 | Buzzard | F16F 7/128 74/493 |
| 2015/0375773 A1 | 12/2015 | Tinnin | |
| 2016/0244015 A1 * | 8/2016 | Dubay | B60R 21/02 |
| 2016/0368524 A1 * | 12/2016 | Tinnin | B62D 1/192 |
| 2017/0050665 A1 * | 2/2017 | Appleyard | B62D 1/192 |

* cited by examiner

*Primary Examiner* — Drew J Brown
(74) *Attorney, Agent, or Firm* — Cantor Colburn LLP

(57) ABSTRACT

An energy absorption assembly includes a first energy absorption strap and a second energy absorption strap. The first energy absorption strap is coupled to a lower jacket assembly and is coupled to an upper jacket assembly. The energy absorption strap defines a first opening and a second opening. The second energy absorption strap is disposed about the first energy absorption strap. The second energy absorption strap is coupled to the first energy absorption strap. The second energy absorption strap defines a third opening proximately aligned with the second opening.

19 Claims, 5 Drawing Sheets

STEERING COLUMN ASSEMBLY HAVING AN ENERGY ABSORPTION ASSEMBLY

CROSS-REFERENCES TO RELATED APPLICATIONS

This patent application claims priority to U.S. Provisional Patent Application Ser. No. 62/180,110, filed Jun. 16, 2015 which is incorporated herein by reference in its entirety.

BACKGROUND OF THE INVENTION

Some steering column assemblies are collapsible along a longitudinal axis. The collapsing of the steering column assembly along the longitudinal axis is energy absorbing and may be beneficial during a vehicle impact event. Roll strap devices are used as a means to absorb kinetic energy during a vehicle impact event in which the steering column may collapse.

Accordingly, it is desirable to provide a system capable of varying the collapse load of the steering column to provide variable kinetic energy dissipation during a steering column collapse event.

SUMMARY OF THE INVENTION

According to an embodiment of the present disclosure, a steering column assembly is provided. The steering column assembly includes a jacket assembly and an energy absorption assembly disposed on the jacket assembly. The energy absorption assembly includes a first energy absorption strap, a second energy absorption strap, and an actuator. The first energy absorption strap has a first strap body that extends between a first energy absorption strap first end coupled to the jacket assembly and a first energy absorption strap second end selectively coupled to the jacket assembly. The second energy absorption strap is at least partially disposed about the first energy absorption strap. The second energy absorption strap has a second strap body that extends between a second energy absorption strap first end coupled to the jacket assembly and a second energy absorption strap second end. The actuator is selectively connected to the first energy absorption strap According to another embodiment of the present disclosure, a steering column assembly is provided. The steering column assembly includes a first energy absorption strap, a second energy absorption strap, and an actuator. The first energy absorption strap has a strap body that extends between a first energy absorption strap first end coupled to an upper jacket assembly and a first energy absorption strap second end selectively coupled to a lower jacket assembly. The first strap body defines a first opening and a second opening. The second energy absorption strap has a second strap body that extends between a second energy absorption strap first end coupled to the upper jacket assembly and a second energy absorption strap second end. The second strap body defines a third opening proximately aligned with the second opening. The actuator has a pin movable between an extended position and a retracted position. The extended position is a position in which the pin is received within the third opening and the second opening. The retracted position is a position in which the pin is not received within the third opening and the second opening.

According to yet another embodiment of the present disclosure, an energy absorption assembly provided with a steering column assembly is provided. The energy absorption assembly includes a first energy absorption strap and a second energy absorption strap. The first energy absorption strap is coupled to a lower jacket assembly and is coupled to an upper jacket assembly. The energy absorption strap defines a first opening and a second opening. The second energy absorption strap is disposed about the first energy absorption strap. The second energy absorption strap is coupled to the first energy absorption strap. The second energy absorption strap defines a third opening proximately aligned with the second opening.

These and other advantages and features will become more apparent from the following description taken in conjunction with the drawings.

BRIEF DESCRIPTION OF THE DRAWINGS

The subject matter which is regarded as the invention is particularly pointed out and distinctly claimed in the claims at the conclusion of the specification. The foregoing and other features, and advantages of the invention are apparent from the following detailed description taken in conjunction with the accompanying drawings in which:

DETAILED DESCRIPTION

Referring now to the Figures, where the invention will be described with reference to specific embodiments, without limiting same, it is to be understood that the disclosed embodiments are merely illustrative of the present disclosure and may be embodied in various and alternative forms. Features or elements of the disclosed embodiments may be combined or removed to form further embodiments. The figures are not necessarily to scale; some features may be exaggerated or minimized to show details of particular components. Therefore specific structural and functional details disclosed herein are not to be interpreted as limiting, but merely as a representative basis for teaching one skilled in the art to variously employ the present disclosure.

Figure 1:
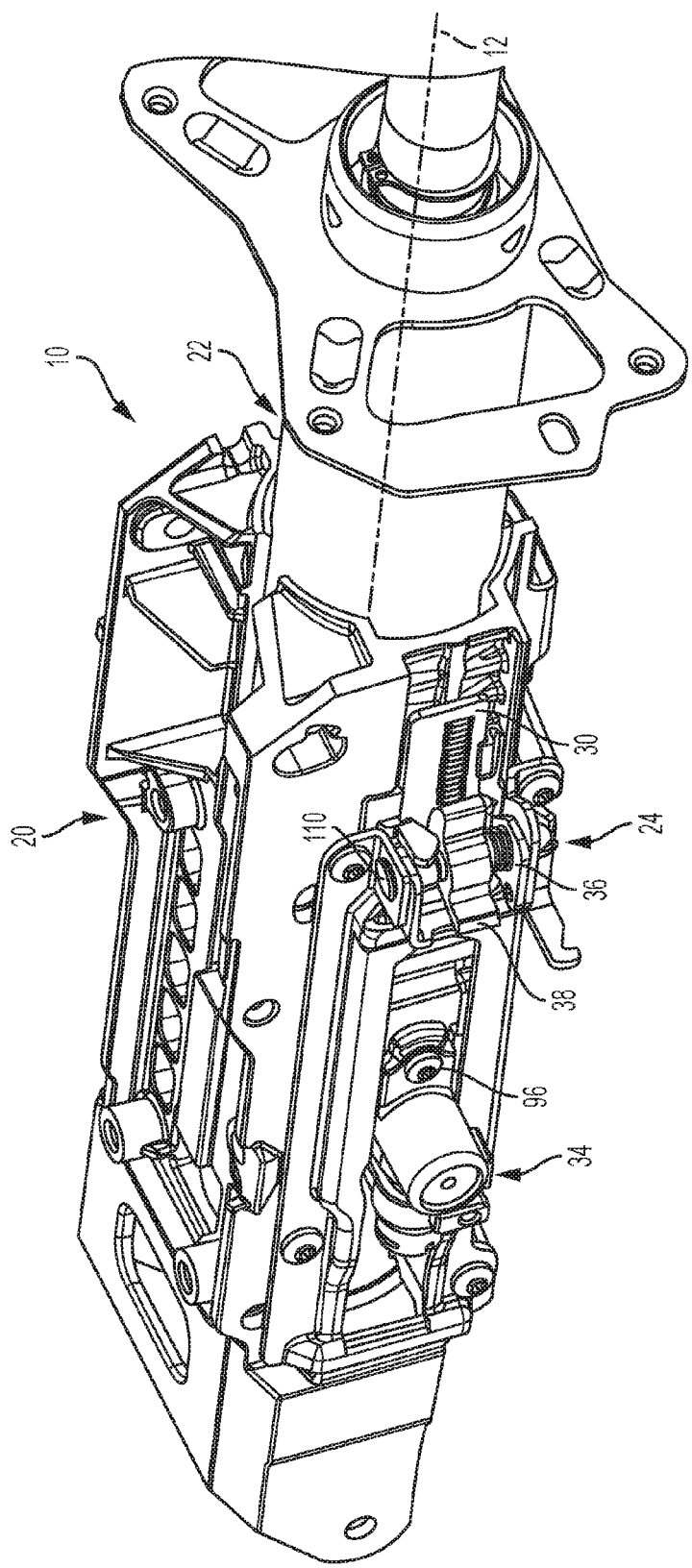
FIG. 1 is a perspective view of a steering column assembly is shown.

Referring to FIG. 1, a steering column assembly 10 is shown. The steering column assembly 10 extends along a steering column axis 12. The steering column assembly 10 is linearly extendable, retractable, and collapsible along the steering column axis 12. The steering column assembly 10 may collapse along the steering column axis 12 in response to a steering column collapse event. The steering column assembly 10 includes a lower jacket assembly 20, an upper jacket assembly 22, and an energy absorption assembly 24.

The lower jacket assembly 20 extends along the steering column axis 12. The lower jacket assembly 20 defines an inner bore. The lower jacket assembly 20 is operatively connected to a vehicle structure by a mounting bracket.

The upper jacket assembly 22 extends along the steering column axis 12. The upper jacket assembly 22 is at least partially received within the inner bore of the lower jacket assembly 20. In at least one embodiment, the combination of the lower jacket assembly 20 and the upper jacket assembly 22 are capable of pivot or rake adjustment about a pivot point directly by the driver or thru a pivot adjust actuator assembly. The pivot point may be defined by the mounting bracket or a similar structure. In at least one embodiment, the upper jacket assembly 22 is extendable or retractable along the steering column axis 12 directly by the driver or thru a telescope actuator assembly. The upper jacket assembly 22 is capable of retracting within the lower jacket assembly 20 in response to a steering column collapse event.

The energy absorption assembly 24 extends between the lower jacket assembly 20 and the upper jacket assembly 22. The energy absorption assembly 24 is configured to provide a drag load or force opposing translation of the upper jacket assembly 22 relative to the lower jacket assembly 20 during a steering column collapse event. The drag load or force opposing translation may be adaptive or variable based on the configuration of the energy absorption assembly 24. The energy absorption assembly 24 includes a first energy absorption strap 30, a second energy absorption strap 32, an actuator 34, a bracket 36, and a strap lock 38.

The first energy absorption strap 30 is configured as a low load energy absorption strap. The first energy absorption strap 30 includes a first strap body 50 extending between a first energy absorption strap first end 52 and a first energy absorption strap second end 54. The first energy absorption strap first end 52 is coupled to the upper jacket assembly 22. The first energy absorption strap second end 54 is selectively coupled to the lower jacket assembly 20.

The strap body 50 includes an arcuate portion 56 and a mounting portion 58 disposed between the first energy absorption strap first end 52 and the first energy absorption strap second end 54. The arcuate portion 56 is disposed adjacent to the mounting portion 58. The arcuate portion 56 is disposed within a first plane and the mounting portion 58 is disposed and a second plane. The first plane is disposed substantially parallel to but not coplanar with the second plane.

The first strap body 50 defines a first opening 60, a second opening 62, a mounting opening 64, and a plurality of engagement members 66. The first opening 60 is disposed proximate the first energy absorption strap first end 52. The first opening 60 extends completely through the first strap body 50.

The second opening 62 is disposed between the arcuate portion 56 and the mounting portion 58. The second opening 62 extends completely through the first strap body 50. In at least one embodiment, the second opening 62 extends through at least a portion of the arcuate portion 56 of the first strap body 50.

The mounting opening 64 extends completely through the mounting portion 58 of the first strap body 50. The mounting opening 64 is disposed between the second opening 62 and the first energy absorption strap second end 54.

The plurality of engagement members 66 are disposed proximate the first energy absorption strap second end 54. The plurality of engagement members 66 are disposed between the mounting opening 64 and the first energy absorption strap second end 54. The plurality of engagement members 66 are configured as protrusions, ridges, teeth, or the like that extend from a surface of the first strap body 50 away from at least one of the lower jacket assembly 20 and the upper jacket assembly 22.

The second energy absorption strap 32 is configured as a high load energy absorption strap. The second energy absorption strap 32 is at least partially disposed about the first energy absorption strap 30. The second energy absorption strap 32 includes a second strap body 70 extending between a second energy absorption strap first end 72 and a second energy absorption strap second end 74. The second energy absorption strap first end 72 is coupled to the upper jacket assembly 22. The second energy absorption strap first end 72 is disposed substantially parallel to the first energy absorption strap first end 52. The second energy absorption strap second end 74 is coupled to the first energy absorption strap 30.

The second strap body 70 includes an arcuate portion 76 disposed between the second energy absorption strap first end 72 and the second energy absorption strap second end 74. The actor portion 76 of the second strap body 70 is disposed adjacent to and about the arcuate portion 56 of the first strap body 50.

The second strap body 70 defines a third opening 80 and a fourth opening 82. The third opening 80 is disposed proximate the second energy absorption strap second end 74. The third opening 80 is proximately aligned with the second opening 62.

The fourth opening 82 is disposed proximate the second energy absorption strap first end 72. The fourth opening 82 is proximately aligned with the first opening 60. A fastener 84 extends through the fourth opening 82 and the first opening 60 to couple the first energy absorption strap first end 52 to the second energy absorption strap second end 74 and the combination to the upper jacket assembly 22.

In at least one embodiment, a strap retainer 86 is provided. The strap retainer 86 engages the first energy absorption strap first end 52 and the second energy absorption strap first end 72. The fastener 84 extends through the first opening 60 and the fourth opening 82 to connect the first energy absorption strap first end 52 and the second energy absorption strap first end 72 to the strap retainer 86 and to the upper jacket assembly 22.

The actuator 34 is connected to at least one of the lower jacket assembly 20 and the first energy absorption strap 30. The actuator 34 may be selectively connected to the first energy absorption strap 30. The actuator 34 is a pyrotechnic actuator that includes a housing 90, a pin 92, a mounting arm 94, and a mounting feature 96. The housing 90 defines a cavity 100 and an opening 102. The cavity 100 is configured to receive a movable member connected to the pin 92. The pin 92 extends through the opening 102.

The cavity 100 defines a combustion chamber that receives a pyrotechnic charge. The pyrotechnic charge produces combustion gases in response to the initiation of combustion and the combustion gases move the movable member and the pin 92 from an extended position towards a retracted position. The pin 92 selectively couples the actuator 34 to the first energy absorption strap 30 and the second energy absorption strap 32. The pin 92 is received within the second opening 62 and the third opening 80 while the pin 92 is in the extended position. The pin 92 is not received within the second opening 62 and the third opening 80 while the pin is in the retracted position.

The mounting arm 94 extends from the housing 90. The mounting arm 94 is disposed substantially parallel to a portion of the first energy absorption strap 30 and a portion of the second energy absorption strap 32. The mounting arm 94 defines a mounting arm opening 104 that is proximately aligned with the mounting opening 64 of the first energy absorption strap 30.

The mounting feature 96 extends through the mounting arm opening 104 and the mounting opening 64. The mounting feature 96 connects the actuator 34 to the first energy absorption strap 30.

The bracket 36 is disposed on the lower jacket assembly 20. At least a portion of the first energy absorption strap 30 extends through the bracket 36.

The strap lock 38 is pivotally connected to the bracket 36 by a pin 110. The strap lock 38 includes a plurality of complementary engagement members 112. The plurality of complementary engagement members 112 are configured as protrusions, ridges, teeth, or the like that extend from a surface of the strap lock 38 towards the plurality of engagement members 66. The plurality of complementary engagement members 112 are configured to selectively engage the plurality of engagement members 66 to selectively couple the first energy absorption strap 30 to the lower jacket assembly 20.

The actuator 34 is in communication with a controller, a control unit, or the like. The controller is configured to provide a signal or a command to the actuator 34 to initiate combustion to move the pin 92 from the extended position towards the retracted position in response to a low load steering column collapse event.

Figure 2:
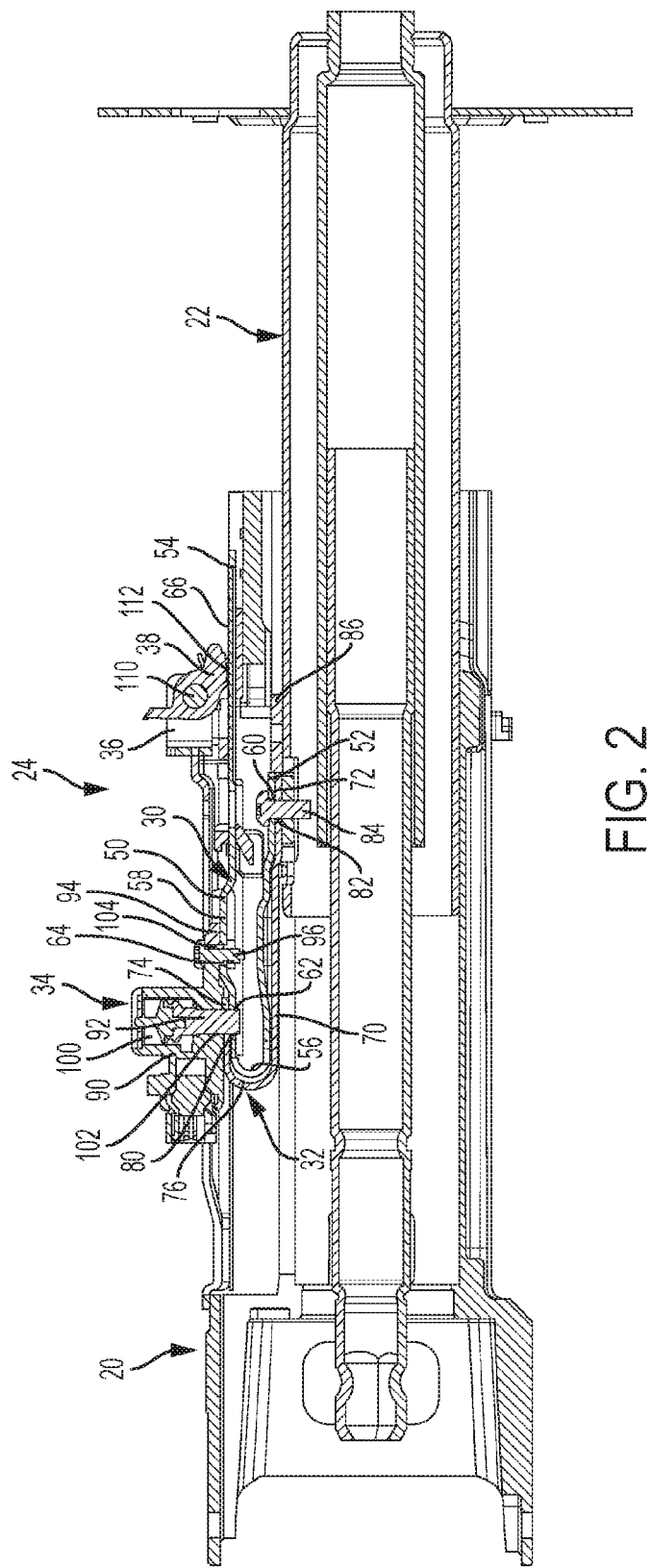
FIG. 2 is a partial cross-sectional view of the steering column assembly of FIG. 1 prior to a high load steering column collapse event.
Figure 3:
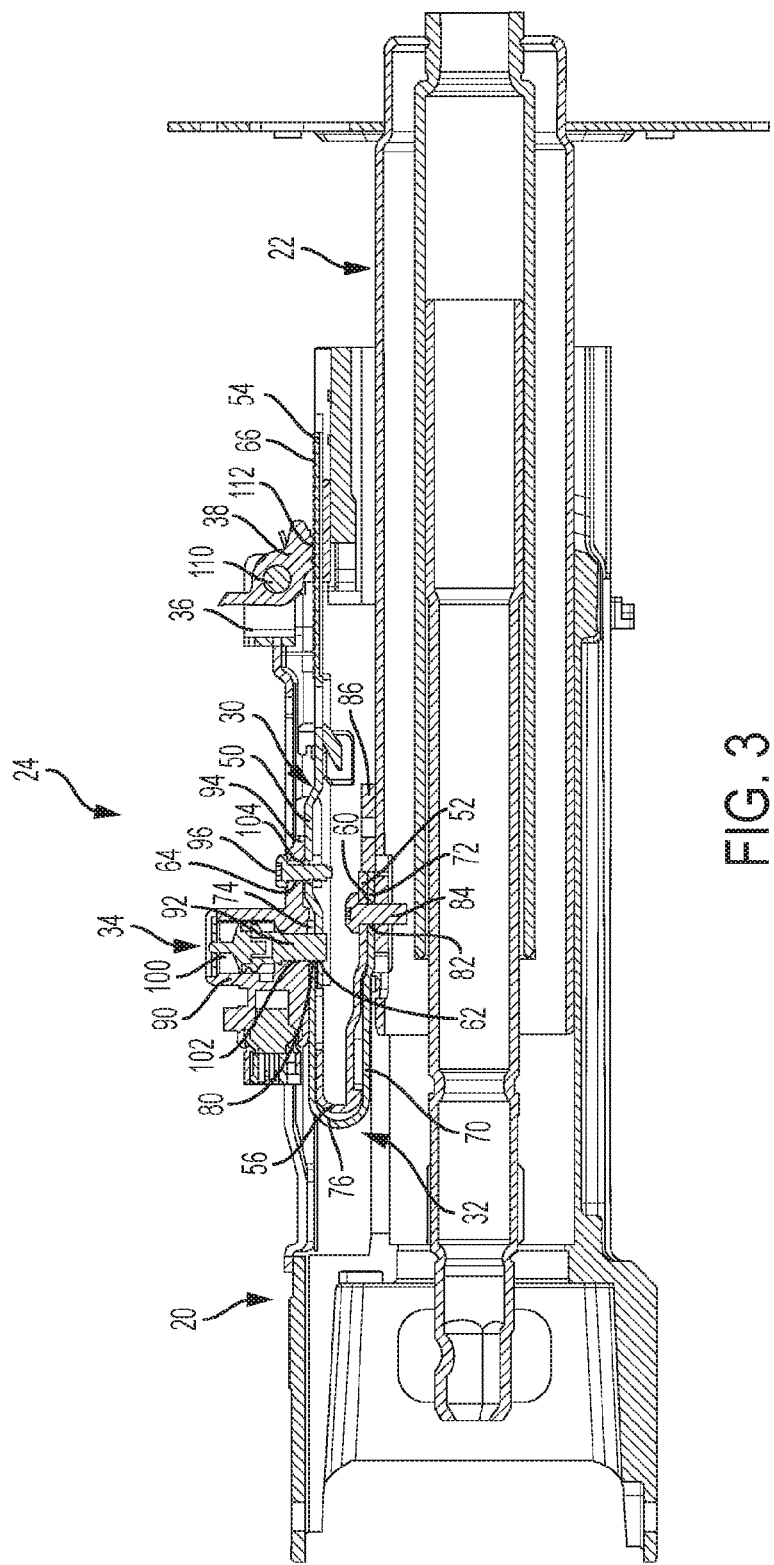
FIG. 3 is a partial cross-sectional view of the steering column assembly of FIG. 1 during/after the high load steering column collapse event.

Referring to FIGS. 2 and 3, a high load steering column collapse event is depicted. Referring to FIG. 2, the controller does not provide a command to the actuator 34 to retract the pin 92 in response to the high load steering column collapse event or a steering column collapse event greater than a predetermined threshold condition. The pin 92 maintains a connection between the first energy absorption strap 30 and the second energy absorption strap second end 54.

Referring to FIG. 3, the upper jacket assembly 22 translates along the steering column axis 12 relative to the lower jacket assembly 20 towards a collapsed position in which the upper jacket assembly 22 is disposed closer to a vehicle instrument panel or further from the original position of the operator of the vehicle. The strap lock 38 locks the first energy absorption strap second end 54 to the lower jacket assembly 20 and the pin 92 locks the second energy absorption strap second end 74 to the first energy absorption strap 30 such that the first energy absorption strap 30 and the second energy absorption strap 32 unroll to create a high load collapse. The high load collapse provides a drag or force opposing translation as a result of the strap retainer 86 pushing the first energy absorption strap first end 52 and the second energy absorption strap first end 72 towards the vehicle instrument panel. The pushing by the strap retainer 86 causes the first energy absorption strap first end 52 and the second energy absorption strap first end 72 to move relative to the first energy absorption strap second end 54 and the second energy absorption strap second end 74.

Figure 4:
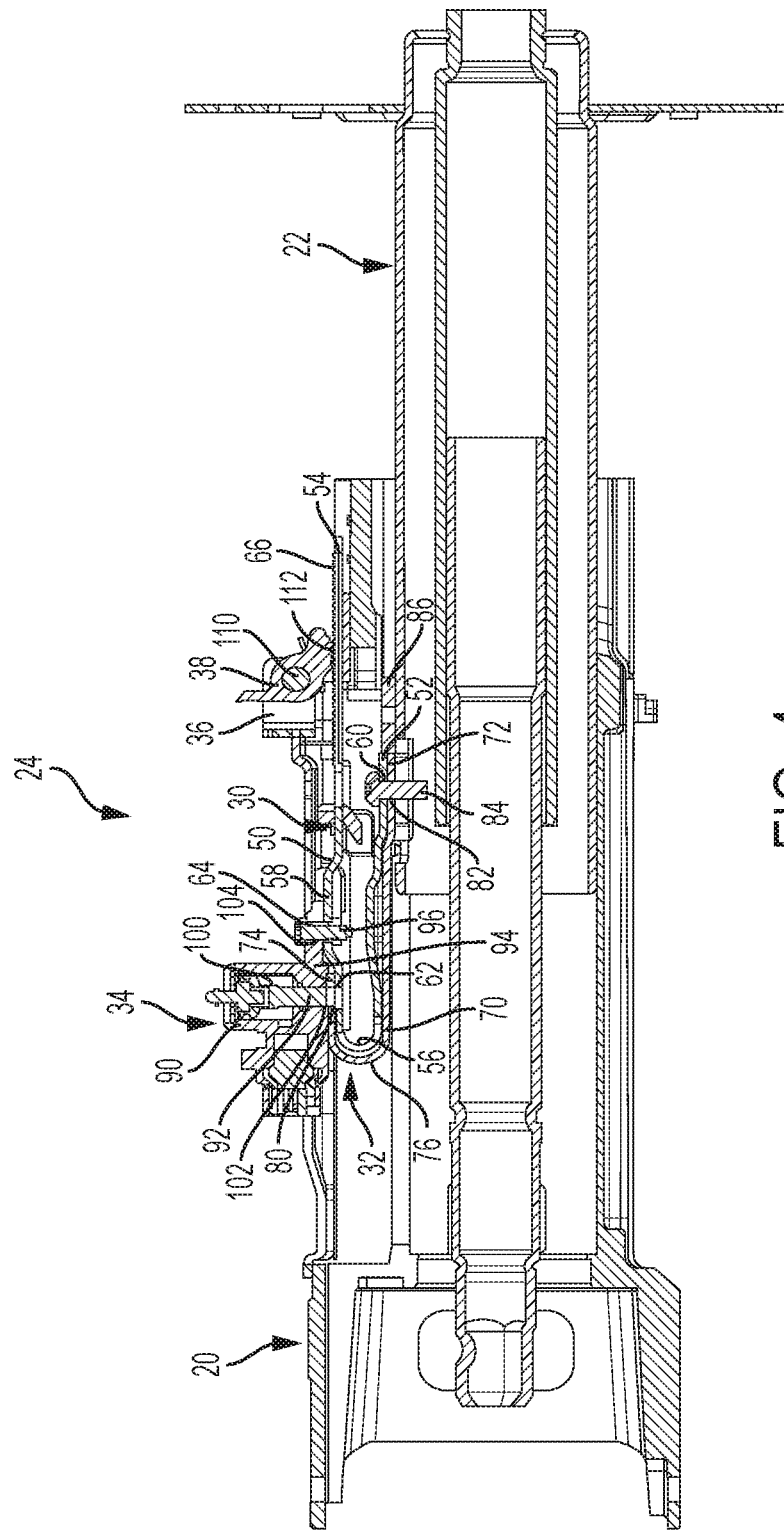
FIG. 4 is a partial cross-sectional view of the steering column assembly of FIG. 1 prior to a lower load steering column collapse event.
Figure 5:
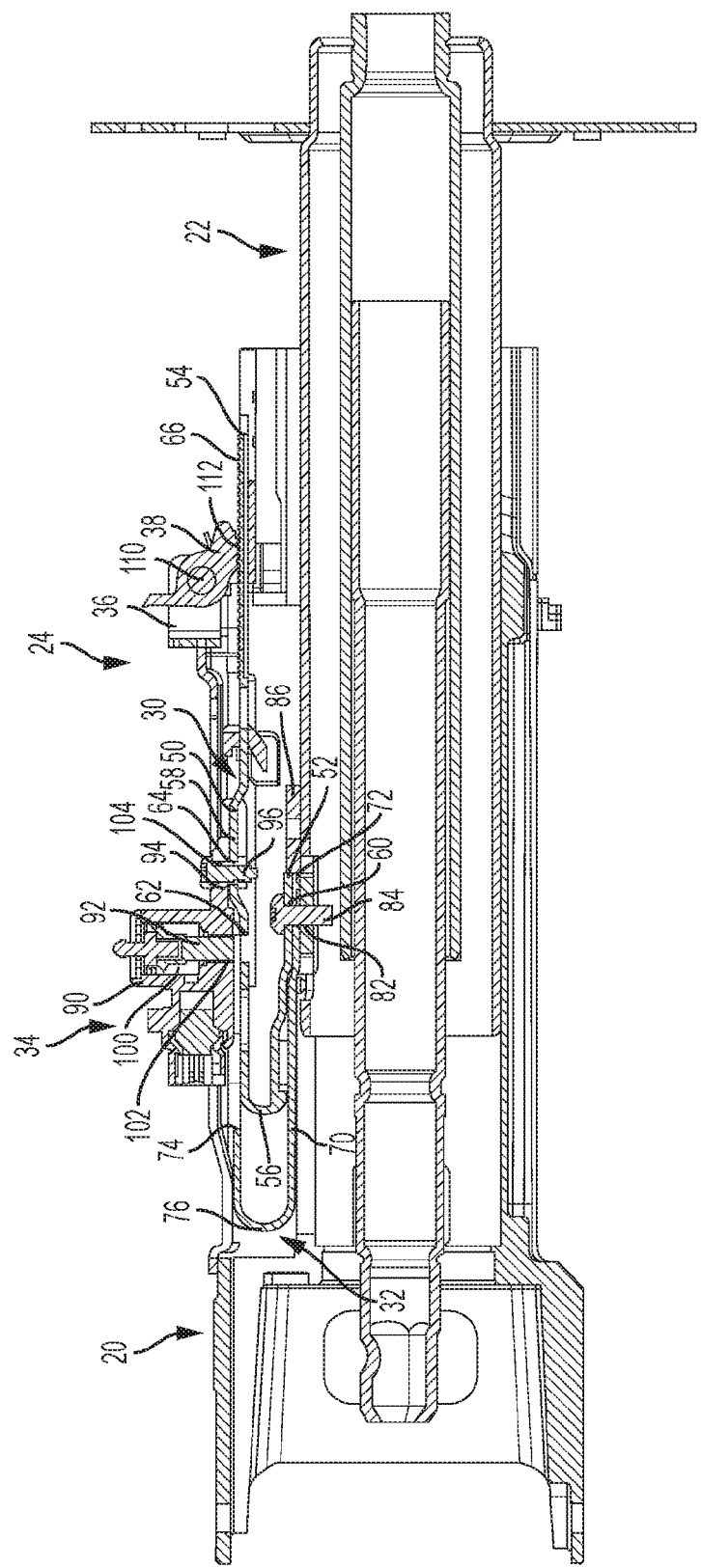
FIG. 5 is a partial cross-sectional view of the steering column assembly of FIG. 1 during/after the lower load steering column collapse event.

Referring to FIGS. 4 and 5 a low load steering column collapse event is depicted. Referring to FIG. 4, the controller provides a command to the actuator 34 to retract the pin 92 in response to a low load steering column collapse event or a steering column collapse event less than a predetermined threshold condition. The pin 92 releases the connection between the first energy absorption strap 30 and the second energy absorption strap second end 54.

Referring to FIG. 5, the upper jacket assembly 22 translates along the steering column axis 12 relative to the lower jacket assembly 20 towards a collapsed position in which the upper jacket assembly 22 is disposed closer to a vehicle instrument panel or further from an operator of the vehicle. The strap lock 38 locks the first energy absorption strap second end 54 to the lower jacket assembly 30 and the pin 92 unlocks the second energy absorption strap second end 74 from the first energy absorption strap 30 such that the first energy absorption strap 30 unrolls to create a low load collapse. The low load collapse provides a drag or force opposing translation less than the drag or force opposing translation generated by the high load collapse as a result of the strap retainer 86 pushing the first energy absorption strap first end 52 and the second energy absorption strap first end 72 towards the vehicle instrument panel. The pushing by the strap retainer 86 causes the first energy absorption strap first end 52 to move relative to the first energy absorption strap second end 54 and the second energy absorption strap 32 to translate without unrolling or building a drag or force opposing translation.

Throughout this specification, the term "attach," "attachment," "connected", "coupled," "coupling," "mount," or "mounting" shall be interpreted to mean that a structural component or element is in some manner connected to or contacts another element, either directly or indirectly through at least one intervening structural element, or is integrally formed with the other structural element.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the scope of the invention. Additionally, while various embodiments of the invention have been described, it is to be understood that aspects of the invention may include only some of the described embodiments. Accordingly, the invention is not to be seen as limited by the foregoing description.

Having thus described the invention, it is claimed:

1. A steering column assembly, comprising:
a jacket assembly; and
an energy absorption assembly disposed on the jacket assembly, the energy absorption assembly including:
a first energy absorption strap having a first strap body extending between a first energy absorption strap first end coupled to the jacket assembly and a first energy absorption strap second end selectively coupled to the jacket assembly;
a second energy absorption strap at least partially disposed about the first energy absorption strap, the second energy absorption strap having a second strap body extending between a second energy absorption strap first end coupled to the jacket assembly and a second energy absorption strap second end; and
an actuator selectively connected to the first energy absorption strap.

2. The steering column assembly of claim 1, wherein the first strap body defines a first opening disposed proximate the first energy absorption strap first end and a second opening.

3. The steering column assembly of claim 2, wherein the second strap body defines a third opening disposed proximate the second energy absorption strap second end.

4. The steering column assembly of claim 3, wherein the third opening is aligned with the second opening.

5. The steering column assembly of claim 4, wherein the actuator includes a pin movable between an extended position and a retracted position.

6. The steering column assembly of claim 5, wherein while the pin is in the extended position the pin is received within the third opening and the second opening.

7. The steering column assembly of claim 5, wherein the pin is configured to move from the extended position towards the retracted position during a steering column collapse event less than a predetermined load.

8. The steering column assembly of claim 7, wherein while the pin is in the retracted position the pin is not received within the third opening and the second opening.

9. The steering column assembly of claim 1, wherein the actuator is a pyrotechnic actuator.

10. A steering column assembly, comprising:
- a first energy absorption strap having a first strap body extending between a first energy absorption strap first end coupled to an upper jacket assembly and a first energy absorption strap second end selectively coupled to a lower jacket assembly, the first strap body defining a first opening and a second opening;
- a second energy absorption strap having a second strap body extending between a second energy absorption strap first end coupled to the upper jacket assembly and a second energy absorption strap second end, the second strap body defining a third opening proximately aligned with the second opening; and
- an actuator having a pin movable between an extended position in which the pin is received within the third opening and the second opening and a retracted position in which the pin is not received within the third opening and the second opening.

11. The steering column assembly of claim 10, wherein the pin is configured to move from the extended position towards the retracted position during a steering column collapse event less than a predetermined load.

12. The steering column assembly of claim 10, wherein the actuator includes a first mounting feature that extends into a mounting opening of the first energy absorption strap to connect the actuator to the first energy absorption strap.

13. The steering column assembly of claim 12, wherein the first energy absorption strap defines a plurality of engagement members disposed between the mounting opening and the first energy absorption strap second end.

14. The steering column assembly of claim 13, further comprising
- a bracket disposed on the lower jacket assembly; and
- a strap lock pivotally connected to the bracket.

15. The steering column assembly of claim 14, wherein the first energy absorption strap at least partially extends through the bracket.

16. The steering column assembly of claim 15, wherein the strap lock includes a plurality of complementary engagement members configured to selectively engage the plurality of engagement members to selectively couple the first energy absorption strap to the lower jacket assembly.

17. An energy absorption assembly provided with a steering column assembly, the energy absorption assembly comprising:
- a first energy absorption strap coupled to a lower jacket assembly and coupled to an upper jacket assembly, the first energy absorption strap defining a first opening and a second opening;
- a second energy absorption strap at least partially disposed about the first energy absorption strap, the second energy absorption strap coupled to the first energy absorption strap, the second energy absorption strap defining a third opening proximately aligned with the second opening; and
- an actuator having a pin configured to move between an extended position in which the pin is received within the third opening and the second opening and a retracted position in which the pin is not received within the third opening in response to a steering column collapse event less than a predetermined load.

18. The energy absorption assembly of claim 17, wherein the actuator is coupled to the first energy absorption strap.

19. An energy absorption assembly provided with a steering column assembly, the energy absorption assembly comprising:
- a first energy absorption strap defining a first opening and a second opening;
- a second energy absorption strap at least partially disposed about the first energy absorption strap, the second energy absorption strap defining a third opening that is proximately aligned with the second opening; and
- an actuator having a pin that is arranged to be selectively received within the third opening and the second opening.

* * * * *